United States Patent
Amey et al.

(10) Patent No.: US 6,291,958 B1
(45) Date of Patent: Sep. 18, 2001

(54) TEMPERATURE LIMITING CONTROLLER FOR ELECTRIC MACHINES

(75) Inventors: David L. Amey, Birmingham; Michael Wayne Degner, Farmington Hills, both of MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/430,608

(22) Filed: Oct. 29, 1999

(51) Int. Cl.[7] ............... G05D 23/00; H02H 5/04
(52) U.S. Cl. ............ 318/471; 318/434; 318/634; 361/25
(58) Field of Search ............ 318/434, 471–473, 318/634, 632, 609–610, 561; 361/23–25, 103–106

(56) References Cited

U.S. PATENT DOCUMENTS

| | | |
|---|---|---|
| 3,868,554 | 2/1975 | Konrad . |
| 4,151,587 * | 4/1979 | Benejean .................... 318/561 |
| 4,672,288 | 6/1987 | Abbondanti . |
| 4,673,031 * | 6/1987 | Wiemer et al. ............. 318/610 |
| 5,160,878 | 11/1992 | Nagano . |
| 5,227,703 | 7/1993 | Boothe et al. . |
| 5,231,339 | 7/1993 | Kishimoto et al. . |
| 5,298,845 * | 3/1994 | DeBoer et al. .............. 318/609 |
| 5,659,235 | 8/1997 | Yamada et al. . |

* cited by examiner

Primary Examiner—Marlon T. Fletcher
(74) Attorney, Agent, or Firm—Jennifer Stec

(57) ABSTRACT

A method (10, 30) for actively controlling the temperature ($t_{motor}$) of an electric machine operating under torque (T*), speed and/or position control. A controlled output (T*), i.e. torque command, voltage, current or power, is adjusted such that the temperature of the electric machine does not exceed a predetermined reference limit ($t_{ref}$). The method (10, 30) of the present invention performs proportional-integral control (14) to reduce the commanded output (T*) to the motor and thereby prevent the steady-state motor temperature ($t_{motor}$) from increasing beyond the predetermined limit ($t_{ref}$). In one embodiment of the method (10), an error term (e) is filtered through a negative pass filter (12) before being combined with an optional decay term ($\epsilon_{decay}$) in a proportional-integral controller (14). A positive pass filter (20) and a negative pass filter (22) provide outputs that are summed and provide an adjusted output command ($T_{limited}$) based upon predetermined relationship. In another embodiment of the present invention, the error term is not filtered, and an output conditioning block (32) is used to determine an adjusted output command ($T_{limited}$).

19 Claims, 2 Drawing Sheets

TEMPERATURE LIMITING CONTROLLER FOR ELECTRIC MACHINES

BACKGROUND OF THE INVENTION

The present invention relates generally to a controller for regulating the temperature of an electric machine, and in particular to a controller which regulates the temperature of an electric machine by adjusting the motor's output based on feedback of a measured motor temperature.

When an electric motor is operated at peak power for an extended period of time, power dissipation is high and the temperature of the motor rises rapidly. It is important to protect an electric motor from overheating to prevent the motor from failure.

It is known in the prior art to control the motor output, such as the commanded torque, based on a measured motor temperature. However, prior art methods, such as the one disclosed in U.S. Pat. No. 5,227,703, reduce the commanded torque by a fixed amount resulting in an open loop control scheme that may not adequately prevent the temperature from rising too high. What is needed is an effective method for regulating temperature of a motor as a protection system for electric motors used in industrial and automotive applications.

SUMMARY OF THE INVENTION

It is an object of the present invention to provide a method for regulating the temperature of an electric machine.

It is another object of the present invention to provide a method that regulates the temperature of the electric machine by adjusting some aspect of the motor output based on feedback of the measured motor temperature. It is yet another object of the present invention to regulate the temperature by adjusting the torque command, the motor voltage, the motor current, or the motor power.

It is a further object of the present invention to apply the method of the present invention to an electric machine having torque control. It is yet a further object of the present invention to apply the method of the present invention to an electric machine having speed control. It is still a further object of the present invention to apply the controller and the method of the present invention to an electric machine having position control.

The present invention is advantageous in that it provides active control of the electric machine to prevent the temperature from rising above a predetermined limit. The present invention is a closed loop control that forces the machine to maintain an operating temperature below a predetermined limit.

In carrying out the above objects and other objects and features of the present invention, a method is provided that allows normal operation of the motor until its temperature exceeds a predetermined limit. Once the predetermined limit is exceeded, the method of the present invention regulates the temperature of the electric machine by adjusting the motor output based on feedback of the measured motor temperature.

The method of the present invention is used with an electric machine having torque control, speed control and/or position control. The method to regulate the temperature is accomplished by adjusting an output of the electric machine. For example, the adjustment can be to the torque control, the motor's voltage, the motor's current, or the motor's power and is adjusted so that the desired temperature limiting result is obtained.

In one embodiment of the method of the present invention, the controller performs proportional-integral (PI) control and reduces the commanded torque, voltage, current, or power to the motor to prevent the steady-state motor temperature from increasing beyond a predetermined limit set by a reference temperature. The PI branch includes a negative pass filter that prevents the controller from operating until the motor temperature exceeds the reference temperature.

In another embodiment of the present invention, the negative pass filter is eliminated from the PI controller. In this embodiment, the proportional branch of the PI controller now influences the dynamics that affect the rate at which the motor adjustment approaches the original commanded adjustment after the motor temperature falls below the reference temperature.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

The method of the present invention regulates the temperature of an electric machine in order to prevent the temperature of the machine's motor from rising to a fault limit, at which the motor must be shut down to prevent failure. The method of the present invention allows normal operation of the motor until the motor temperature exceeds a predetermined limit. The method of the present invention, provides for a controller to regulate the temperature of the electric machine by adjusting an aspect of the motor output based on the feedback of the measured motor temperature.

There are multiple variations of this method in that various aspects of the electric machine control and the motor output are used in regulation of the motor temperature. For example, for an electric machine having torque control, it is possible to adjust the maximum output torque. In addition to adjusting the torque command, the method could also be applied to adjust the motor's voltage, current or power when the electric machine is under speed and/or position control. Keeping this in mind, two embodiments of the present invention will be described herein with reference to a machine operating under torque control, and the torque command will be adjusted to achieve the desired temperature limiting function. One skilled in the art will know how to apply the method of the present invention using the various alternatives of engine output and machine control available.

In general, the method of the present invention compares a measured motor temperature to a reference temperature to determine an error. The error signal is used in a proportional-integral (PI) controller having a limited integrator. The output of the (PI) controller is used to modify the torque command as needed to regulate the temperature of the electric machine.

Figure 1:
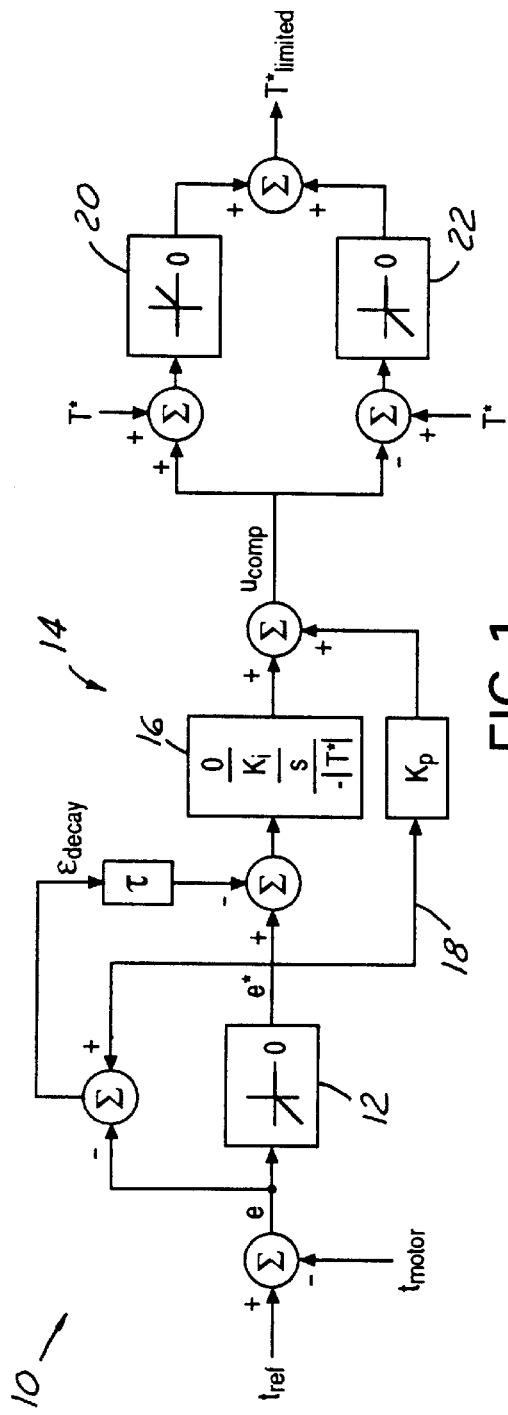
FIG. 1 is a block diagram of one embodiment of the motor temperature regulation method of the present invention.

A first embodiment of the method 10 of the present invention is shown in block diagram form in FIG. 1. Proportional-integral control is performed to reduce the commanded torque to the motor, T*, and to prevent the steady-state motor temperature from increasing beyond a predetermined limit set by the reference temperature. An output, T*$_{limited}$, is the newly adjusted torque command and represents the maximum allowable torque command, in steady state, to keep the motor at or below the reference temperature.

An error term, e, is generated by the difference between the reference temperature, $t_{ref}$, and the actual motor temperature, $t_{motor}$. The error, e, is filtered through a negative pass filter 12, which is described by the following equations:

$$e^* = \begin{cases} e & < 0 \\ 0 & e \geq 0 \end{cases}$$

where e* is the output of the negative pass filter 12 in FIG. 1. The filtered error e*, is fed into a proportional-integral (PI) controller 14 having a limited integrator 16. The negative pass filter 12 prevents the PI controller 14 from operating until the motor temperature, $t_{moto}$, exceeds the reference temperature, $t_{ref}$.

The limited integrator 16 has a range that prevents the integration state from accumulating beyond the value necessary to completely shut off the torque command to the motor (–|T*|). The integration state is also limited to always be less than zero so that no additional torque is added to the command T*. In other words, |T*$_{limited}$|≦|T*|. The proportional gain $K_p$ and integral gain $K_I$, are tuned to provide the desired dynamic response of the temperature and motor torque.

A decay term, $\epsilon_{decay}$, may be added to the input of the integrator 16 for the PI controller 14. The optional decay term is the result of e*–e and can be described by the following equation:

$$\varepsilon_{decay} = \begin{cases} 0 & e \leq 0 \\ e^* - e & e > 0 \end{cases}$$

Therefore, when e transitions from negative to positive where e=0, for example when the motor temperature falls below the reference temperature, the proportional branch 18 of the PI controller 14 goes to zero, while the integrator state is driven to zero by the term $\epsilon_{decay}\tau$. The gain, $\tau$, is used to tune the rate at which the integrator 16 goes to zero. This loop provides a smooth transition from T*$_{limited}$ to T* so that the output torque of the machine can be maximized while still limiting its temperature and it prevents possible harsh torque dynamics induced by resetting the integrator.

The output of the PI controller 14, $u_{comp}$, is then added to the torque command T* in one branch and filtered through a positive pass filter 20, resulting in the following relationship:

$$T^*_{output} = \begin{cases} 0 & T^* + u_{comp} \leq 0 \\ T^* + u_{comp} & T^* + u_{comp} > 0 \end{cases}$$

In addition, $u_{comp}$ is subtracted from T* and passed through a negative pass filter block 22. It is possible to use the same negative pass filter 12 as described earlier with reference to the error term. In any event, the output of the negative filter block 22 is then added to the output of the positive pass filter 20. Effectively, these two branches prevent the controller 14 from reversing the sign of the commanded torque, and can be described by the following equations:

$$T^*_{limited} = \begin{cases} T^* + u_{comp} & T^* > 0 \\ T^* - u_{comp} & T^* < 0 \\ 0 & T^* = 0 \end{cases}$$

Figure 2:
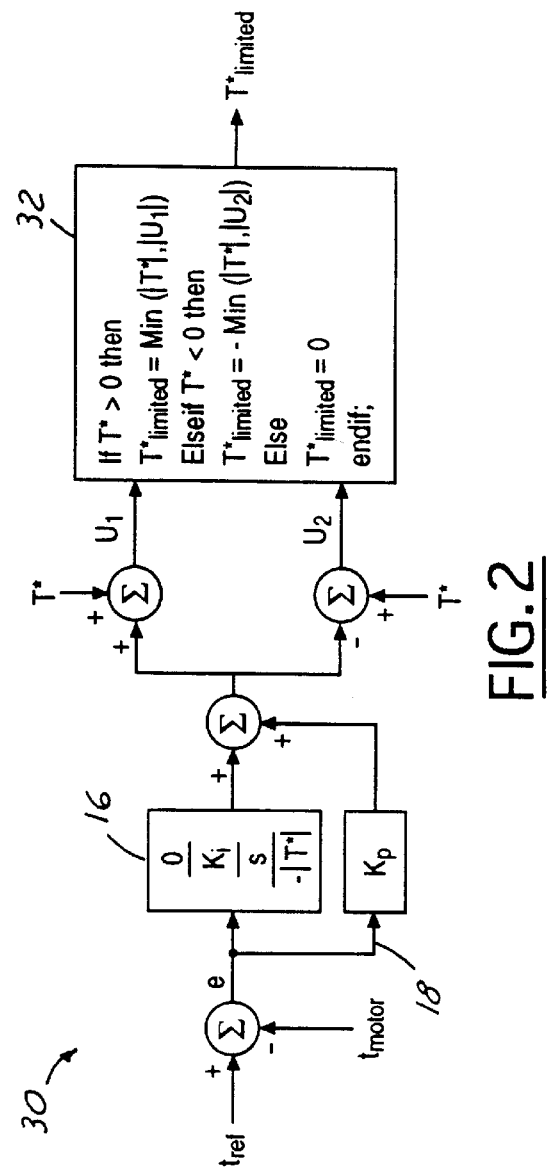
FIG. 2 is a block diagram of another embodiment of the motor temperature regulation method of the present invention.

In another embodiment of the method 30 of the present invention, shown in FIG. 2, the negative pass filter on the temperature error term is eliminated. Without the negative pass filter, the proportional branch 18 of the PI controller 14 has influence on the dynamics that effect the rate at which T$_{limited}$ approaches the original torque command, T*, after the motor temperature falls back below the reference temperature. The limited integrator 16 in the PI controller limits the integrator state to be between 0 and –|T*|, which prevents the integrator from accumulating before the error term, e, first goes negative, and prevents the integrator from accumulating beyond what is needed to drive the torque command to 0.

An output conditioning block 32 sets the torque command equal to the result of adding or subtracting the output of the PI controller 14 from the original torque command, depending on whether the command is positive or negative. In addition, the output torque command is conditioned so that it does not exceed the original torque command in absolute value.

Figure 3A:
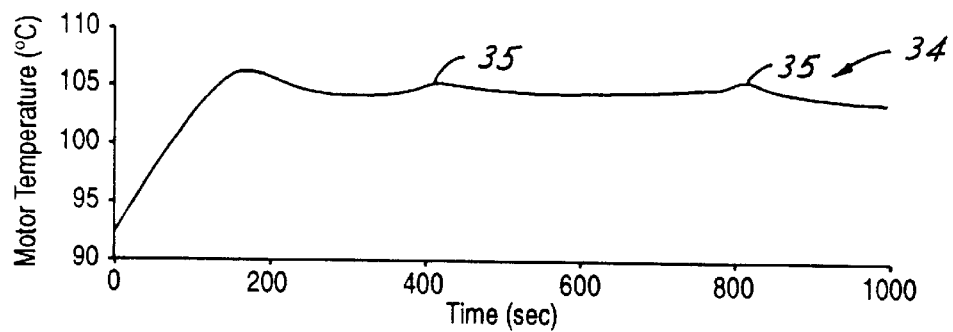
FIG. 3a is a graph showing the motor temperature of an electric machine using the first embodiment of the motor temperature regulation method of the present invention.
Figure 3B:
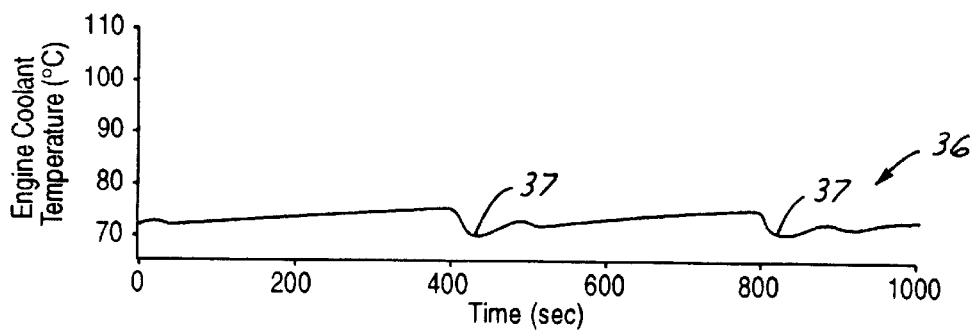
FIG. 3b is a graph showing the engine coolant temperature in an electric machine using the first embodiment of the motor temperature regulation method of the present invention.

A test was conducted using the first embodiment 10 of the present invention. The test vehicle contained a starter/alternator induction machine with a diesel engine. The engine was run at idle speed (approximately 700 RPM), while applying a –17 Nm torque load from the starter/alternator. The reference temperature was set to 105° C. Data was recorded once the starter/alternator motor reached 90° C. FIG. 3a shows the rise in the motor's temperature 34. FIG. 3b shows the temperature of the engine coolant 36, which is a good estimate of the ambient temperature around the starter/alternator.

From the graphs shown in FIGS. 3a and 3b, it is clear that the controller, using the method of the present invention, successfully regulated the motor temperature to the specified temperature of 105° C. with only minor oscillations 35 as shown in FIG. 3a. FIG. 3b also shows oscillations 37 in the engine coolant temperature. It was determined that the oscillations were the result of an engine coolant fan in the engine turning on when the engine coolant temperature reached 75° C. It may be possible to compensate for the oscillations by providing a feedforward of engine coolant temperature into the control method of the present invention.

Figure 4A:
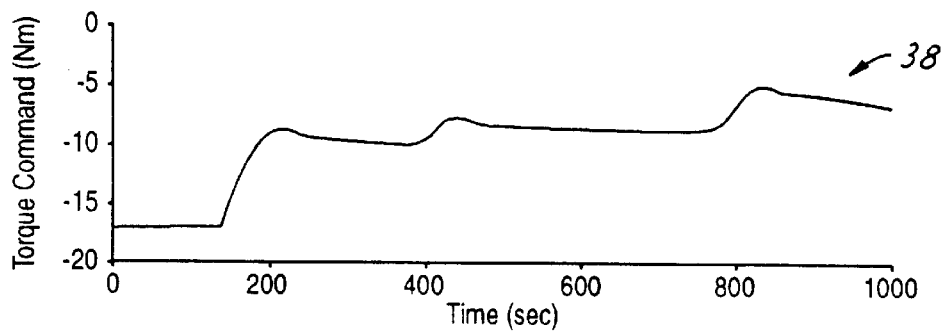
FIG. 4a is a graph showing the torque command for the first embodiment of the motor temperature regulation method of the present invention.
Figure 4B:
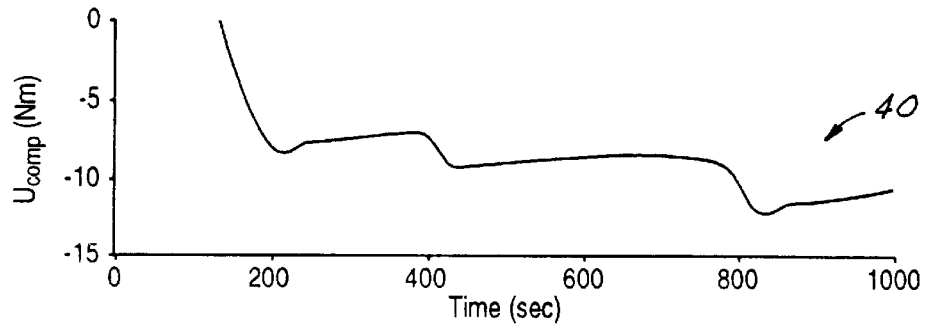
FIG. 4b is a graph showing the PI controller output data for the first embodiment of the motor temperature regulation method of the present invention.

FIGS. 4a and 4b show the action of the torque command for the results discussed above. FIG. 4a shows the torque command 38 and that it remains constant at −17 Nm until the motor temperature rises above 105° C., just before 200 seconds. At this point, the output 40 of the PI controller, $u_{comp}$, shown in FIG. 4b, begins to reduce the torque command to prevent the temperature from rising above 105° C. According to the first embodiment of the present invention, since the torque command is negative, the output of the PI controller is subtracted from the torque command.

The invention covers all alternatives, modifications, and equivalents, as may be included within the spirit and scope of the appended claims.

What is claimed is:

1. A method for regulating a temperature of a motor in an electric machine having a controlled output, said method comprising the steps of:

generating an error term defined by the difference between a predetermined reference temperature and a measured motor temperature;

filtering said error term through a negative pass filter whereby said filtered error term is set to zero for a measured motor temperature that is less than or equal to said predetermined reference temperature;

feeding said filtered error into a proportional-integral controller having a limited integrator, and proportional and integral gains;

adding an output of the proportional-integral controller defined as $u_{comp}$ to said controlled output;

filtering the sum of $u_{comp}$ and said controlled output through a positive pass filter;

subtracting $u_{comp}$ from said controlled output;

filtering the difference between $u_{comp}$ and said controlled output through a negative pass filter;

summing the outputs of said positive pass filter and said negative pass filter to define an adjusted controlled output for preventing said motor temperature from rising above said predetermined reference temperature.

2. The method as set forth in claim 1 further comprising the step of adding a decay term to said limited integrator, said decay term being defined by a difference between said filtered error term and said error term.

3. The method as set forth in claim 2 wherein said decay term further comprises a gain, τ, for tuning a rate at which said limited integrator approaches zero to allow a smooth transition from said adjusted controlled output to said controlled output.

4. The method as set forth in claim 1 wherein said limited integrator has a range such that an integration state of said integrator cannot accumulate beyond a value necessary to shut off said controlled output.

5. The method as set forth in claim 4 wherein said integration state is always less than zero.

6. The method as set forth in claim 1 wherein said proportional and integral gains are tuned for providing desired dynamic responses of said temperature and controlled output.

7. The method as claimed in claim 1 wherein $T^*_{limited}$ is said adjusted controlled output and $T^*$ is a command torque and wherein $T^*_{limited}$ is described by the following relationship:

$$T^*_{limited} = \begin{cases} T^* + u_{comp} & T^* > 0 \\ T^* - u_{comp} & T^* < 0 \\ 0 & T^* = 0 \end{cases}$$

8. The method as claimed in claim 1 wherein said controlled output is chosen from a group consisting of torque command, voltage command, current command and power command.

9. The method as claimed in claim 8 wherein said controlled output is torque command for an electric machine having torque control.

10. The method as claimed in claim 8 wherein said controlled output is chosen from a group consisting of voltage, current and power for an electric machine having speed control.

11. The method as claimed in claim 8 wherein said controlled output is chosen from a group consisting of voltage, current and power for an electric machine having position control.

12. A method for regulating a temperature of a motor in an electric machine having a controlled output, said method comprising the steps of:

generating an error term defined by the difference between a predetermined reference temperature and a measured motor temperature;

feeding said error term into a proportional-integral controller having a limited integrator, and proportional and integral gains for producing an output $u_{comp}$;

conditioning an adjusted controlled output by adding $u_{comp}$ to said controlled output for said controlled output greater than zero;

conditioning said adjusted controlled output by subtracting $u_{comp}$ from said controlled output for said controlled output less than zero; and conditioning said adjusted controlled output by setting said adjusted controlled output to zero for a controlled output equal to zero thereby maintaining said measured motor temperature that is less than or equal to said predetermined reference temperature.

13. The method as set forth in claim 12 wherein said limited integrator has a range such that an integration state of said integrator cannot accumulate beyond a value necessary to shut off said controlled output.

14. The method as set forth in claim 13 wherein said integration state is always less than zero.

15. The method as set forth in claim 12 wherein said proportional and integral gains are tuned for providing desired dynamic responses of said temperature and controlled output.

16. The method as claimed in claim 12 wherein said controlled output is chosen from a group consisting of torque command, voltage command, current command and power command.

17. The method as claimed in claim 16 wherein said controlled output is torque command for an electric machine having torque control.

18. The method as claimed in claim 16 wherein said controlled output is chosen from a group consisting of voltage, current and power for an electric machine having speed control.

19. The method as claimed in claim 16 wherein said controlled output is chosen from a group consisting of voltage, current and power for an electric machine having position control.

* * * * *